US012346701B2

(12) United States Patent
Tang et al.

(10) Patent No.: US 12,346,701 B2
(45) Date of Patent: Jul. 1, 2025

(54) SHARING GLOBAL VARIABLES BETWEEN ADDRESSING MODE PROGRAMS

(71) Applicant: International Business Machines Corporation, Armonk, NY (US)

(72) Inventors: Xiao Yan Tang, Beijing (CN); Naijie Li, Beijing (CN); Jing Lu, Beijing (CN); Ming Ran Liu, Beijing (CN); Yuan Zhai, Beijing (CN); Kershaw S. Mehta, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 17/518,069

(22) Filed: Nov. 3, 2021

(65) Prior Publication Data

US 2023/0136606 A1    May 4, 2023

(51) Int. Cl.
*G06F 9/445* (2018.01)
*G06F 9/30* (2018.01)
(Continued)

(52) U.S. Cl.
CPC ........ *G06F 9/44505* (2013.01); *G06F 9/3004* (2013.01); *G06F 9/5016* (2013.01); *G06F 12/0238* (2013.01)

(58) Field of Classification Search
CPC .................................................. G06F 9/44505
See application file for complete search history.

(56) References Cited

U.S. PATENT DOCUMENTS 5,452,456 A    9/1995  Mourey
5,577,253 A *  11/1996 Blickstein ............... G06F 8/443
                                                 717/146
(Continued)

FOREIGN PATENT DOCUMENTS

CN    105094870 A    11/2015
CN    103455361 B    2/2017

OTHER PUBLICATIONS

Anonymous, "Statically Linking Amode M and Amode N Programs," IP.com, Disclosure No. IPCOM000264320D, Dec. 2, 2020, 3 pages. <https://priorart.ip.com/IPCOM/000264320>.
(Continued)

*Primary Examiner* — Charlie Sun
(74) *Attorney, Agent, or Firm* — Jared C. Chaney

(57) ABSTRACT

Global variables are shared between programs associated with different addressing modes. A first program of an application records an allocated address to a global variable in a global variable sharing area (GVSA). The first program is associated with a first addressing mode. The first program specifies the global variable to be shared across different addressing modes. An address of the GVSA is passed to a second program of the application that is loaded after the first program has been loaded. The second program is associated with a second addressing mode different from the first addressing mode. The second program also specifies the global variable in the second program to be shared across different addressing modes. The second program retrieves the allocated address to the global variable from the GVSA based on the address of the GVSA. The second program accesses the global variable based on the retrieved allocated address.

20 Claims, 13 Drawing Sheets

(51) Int. Cl.
*G06F 9/50* (2006.01)
*G06F 12/02* (2006.01)

(56) References Cited

U.S. PATENT DOCUMENTS

| | | |
|---|---|---|
| 5,724,585 A | 3/1998 | Hassitt |
| 5,784,638 A | 7/1998 | Goetz |
| 6,199,202 B1 | 3/2001 | Coutant |
| 7,171,543 B1 | 1/2007 | Ronen |
| 7,451,298 B2 | 11/2008 | Peak |
| 2004/0268319 A1 | 12/2004 | Tousignant |
| 2008/0034194 A1 | 2/2008 | Peak |
| 2012/0233612 A1 | 9/2012 | Beckett |
| 2015/0277867 A1 | 10/2015 | Hasabnis |
| 2020/0192730 A1 | 6/2020 | Li |
| 2020/0326942 A1 | 10/2020 | Lu |

OTHER PUBLICATIONS

Coglio et al., "Adding 32-bit Mode to the ACL2 Model of the x86 ISA," https://arxiv.org/pdf/1810.04313.pdf, ACL2 Theorem Prover and its Applications (ACL2-2018), EPTCS 280, 2018, pp. 77-94, doi: 10.4204/EPTCS.280.6.

Mell et al., "The NIST Definition of Cloud Computing," Recommendations of the National Institute of Standards and Technology, U.S. Department of Commerce, Special Publication 800-145, Sep. 2011, 7 pages.

Microsoft, "32-bit and 64-bit Interoperability," https://docs.microsoft.com/en-US/windows/win32/winauto/32-bit-and-64-bit-interoperability, May 31, 2018, 2 pgs., printed Jul. 29, 2021.

Microsoft, "32-Bit and 64-Bit WIA Interoperability," GitHub, Jul. 5, 2021, 2 pages. <https://github.com/MicrosoftDocs/windows-driver-docs/blob/staging/windows-driver-docs-pr/image/32-bit-and-64-bit-wia-interoperability.md>.

Tang et al., "IBM z/OS V2.5: Enabling innovative development to support hybrid cloud and AI business applications," Grace Period Disclosure, Jul. 27, 2021, 54 pages.

\* cited by examiner

SHARING GLOBAL VARIABLES BETWEEN ADDRESSING MODE PROGRAMS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): TANG et al., "IBM z/OS V2.5: Enabling innovative development to support hybrid cloud and AI business applications," Grace Period Disclosure, 27 Jul. 2021, 54 pages.

BACKGROUND

The present disclosure relates to global variables in programs, and more specifically, to sharing global variables between programs associated with different addressing modes.

A 64-bit processor architecture is capable of referencing a considerably larger memory space than a 32-bit processor architecture and is thus gradually replacing the 32-bit processor architecture. Accordingly, 64-bit operating system (O/S) and 64-bit computer programs, applications, or the like typically written for the 64-bit O/S, all of which are configured to run on a 64-bit processor, are prevailing over their 32-bit counterpart that is configured to run on a 32-bit processor, i.e. 32-bit O/S and corresponding 32-bit computer programs, applications, or the like.

SUMMARY

According to one embodiment of the present disclosure, there is provided a computer-implemented method. A first program of an application records an allocated address to a global variable in a global variable sharing area (GVSA). The first program is associated with a first addressing mode. The first program specifies the global variable in the first program to be shared across different addressing modes. An address of the GVSA is passed to a second program of the application that is loaded after the first program has been loaded. The second program is associated with a second addressing mode different from the first addressing mode. The second program also specifies the global variable in the second program to be shared across different addressing modes. The second program retrieves the allocated address to the global variable from the GVSA based on the address of the GVSA. The second program accesses the global variable based on the retrieved allocated address.

According to another embodiment of the present disclosure, there is provided a computer system. The computer system comprises a processor and a computer-readable memory coupled to the processor, the memory comprising instructions that when executed by the processor implement the methods as provided according to embodiments of the present disclosure.

According to another embodiment of the present disclosure, there is provided a computer program product. The computer program product comprises a computer readable storage medium having program instructions embodied therewith, the program instructions executable by a processor to cause the processor to implement the methods as provided according to embodiments of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
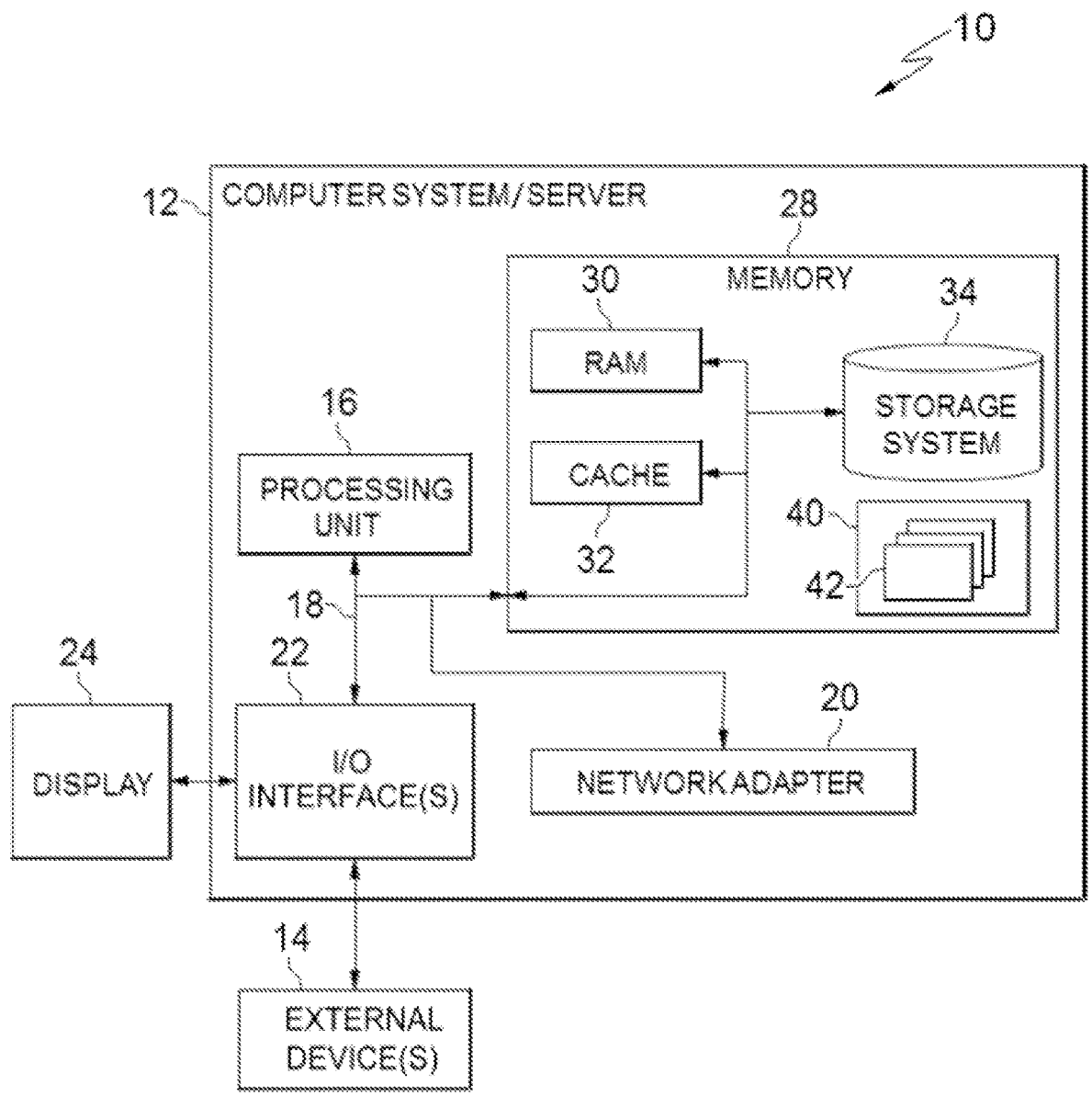
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
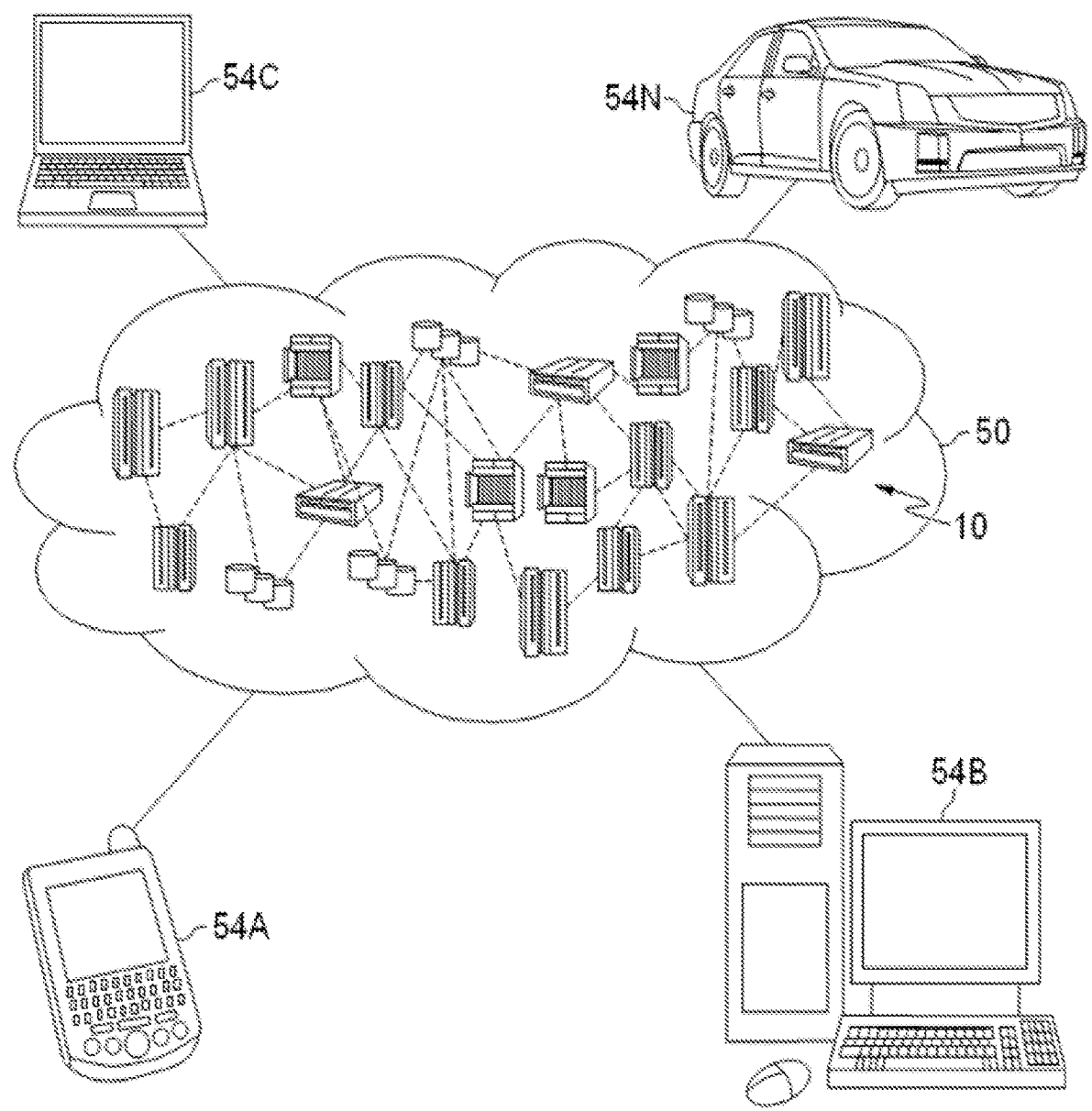
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
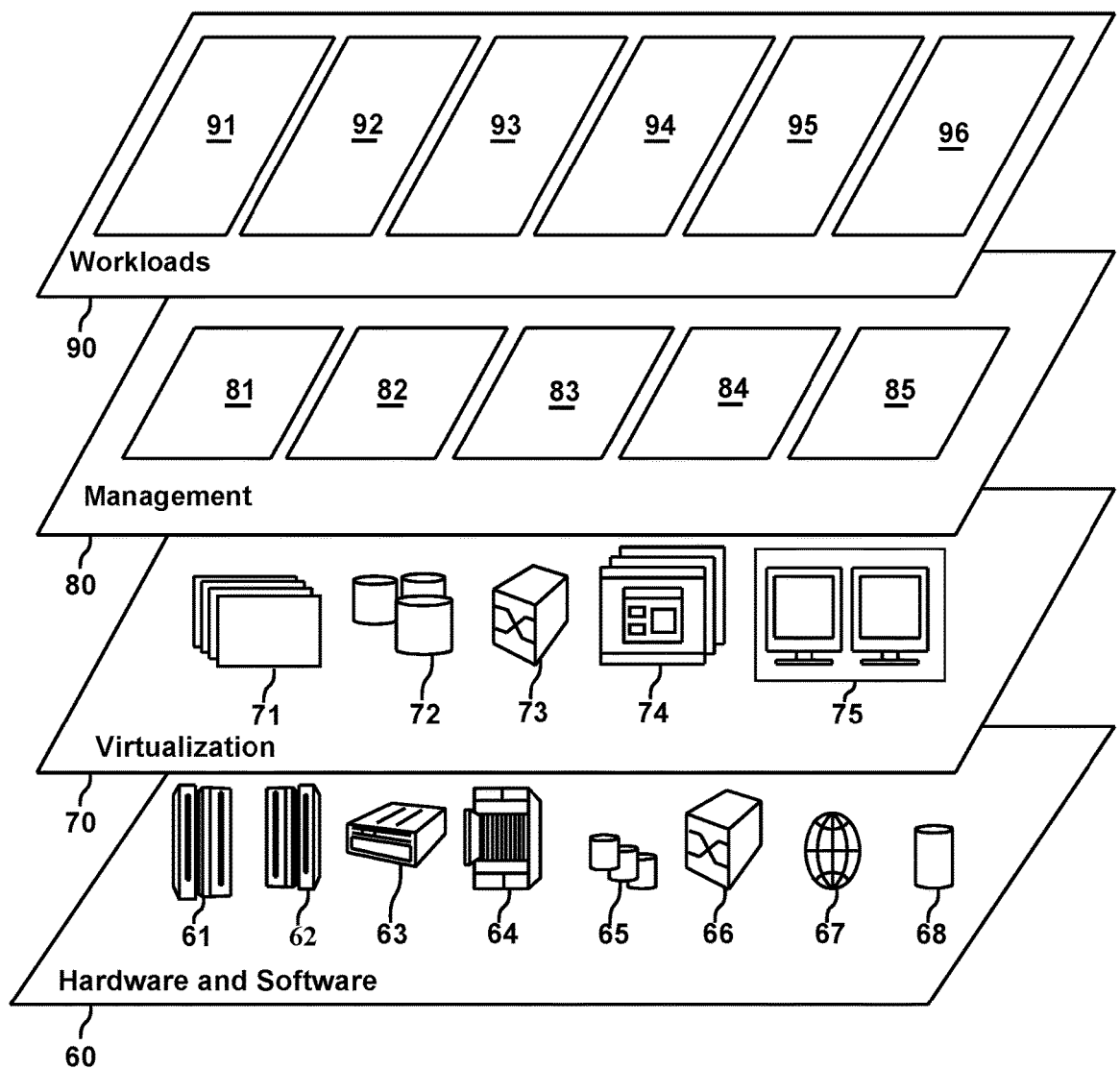
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and global variable cross-addressing mode (cross-AMODE) sharing 96. In the following, the principle and structure of global variable cross-AMODE sharing 96 will be described with references to FIG. 4-8.

Example embodiments of the disclosure relate to, among other things, systems, methods, computer-readable media, techniques, and methodologies for sharing global variables between programs associated with different addressing modes.

The different addressing modes (AMODEs) may be referred to herein generically as AMODE M and AMODE N, where M and N are different values. For instance, in example embodiments, a program associated with addressing mode AMODE M may be a 31-bit or 32-bit program and a program associated with addressing mode AMODE N may be a 64-bit program, or vice versa. While example embodiments may be described with respect to 32-bit and 64-bit programs, it should be appreciated that the programs may be any N-bit and M-bit programs as long as N and M represent different values (i.e., different addressing modes). It should be further appreciated that while some example embodiments may be described with respect to two programs associated with two different addressing modes, the number of involved programs may be more than two and accordingly the number of addressing modes may be more than two. For example, when three different addressing modes are discussed, they may be referred to herein as AMODE M, AMODE N and AMODE P, where P is a value different from M and N. In addition, the term program as used herein encompasses any software application, program module, or more generally, computer-executable code configured to execute on a computer processor. Further, global variables as used herein are sometimes referred to as external variables. As opposed to local variables which are only valid within the functions that define them, global variables are valid throughout the whole source application (such as an .exe application in Windows O/S or an .elf application in Linux O/S) across different functions of the application. Once a global variable is declared and defined somewhere in the application, it would be valid in the whole application thereafter.

Recent years have seen the emergence of an increasing number of 64-bit programs, which provide better scalability and much larger memory addressability than 32-bit programs, for example. Further, more 64-bit programs are being written to leverage certain innovations only available with the 64-bit addressing mode. There remain, however, many 32-bit programs that continue to play a vital role in critical workloads. Thus, interaction or interoperability between 32-bit programs and 64-bit programs is necessary to modernize the business logic of workloads, while at the same time, maintaining the viability of legacy 32-bit programs. Applications that include interoperation between programs associated with different addressing modes would still be seen for quite a long time.

The interoperation between programs associated with different addressing modes may involve cross-AMODE function calls (i.e., calls between a caller and a callee associated with different addressing modes) including, without limitation, dynamic linkage function calls (e.g., where the caller and the callee are in different executables); static linkage function calls (e.g., where the caller and the callee are in the same executable); dynamic calls; and so forth.

There are various differences between different addressing modes that make interoperability between programs written in the different addressing modes difficult including, without limitation, different memory addressability capabilities (e.g., 4 gigabyte for a 32-bit addressing mode and 16 exabytes for a 64-bit addressing mode) and different linkage conventions that define how stack frames are managed and how parameters are passed. With respect to linkage convention differences, in a 64-bit program, for example, save areas and registers are twice as large as in a 32-bit program such that calling conventions for a 64-bit program take advantage of the additional register space to pass more arguments in registers. Further, 32-bit programs utilize a standard linkage convention (upward stack) while 64-bit programs utilize a different linkage convention (downward stack). In addition, different addressing mode programs run in different runtime environments with independent state information such as stack from state or control block state. Worse still, interoperability was not considered during initial 64-bit addressing mode design. Cross addressing mode interoperability need to stay compatible with the existing 64-bit addressing mode support used by programming language such as C/C++, IBM PL/I, Swift, Node.js, Java or the like for inter-language communication. Therefore, many issues are not only about how to cross addressing modes, but also related to how to cross linkage convention, cross runtime (especially stacks) and cross programing languages.

There are various existing approaches for supporting 32-bit and 64-bit interactions, each of which suffers from various technical drawbacks. For example, inter-process communication has been used but the overhead that it introduces contributes to poor performance. Moreover, redesign of the original application is required including additional development and testing which requires significant effort and can result in significant delay. In addition, each programming language has its own inter-process communication semantics which can result in issues for calls between different languages. Another existing approach for supporting 32-bit and 64-bit interactions is a remote call based on, for example, a RESTful Application Programming Interface (API). However, the performance associated with remote calls is even worse than with inter-process communication. Yet another existing approach is to recompile an application. For example, a 32-bit application can be recompiled as a 64-bit application. This approach, however, is an all-or-none approach that requires recompilation of all programs in an application, which can be a disruptive migration particularly for large enterprises. In addition, some languages still have no 64-bit support (e.g., Enterprise COBOL).

Further, it becomes more complicated and difficult if one of the interoperating programs associated with different addressing modes shares global variables with another of the interoperating programs. Generally, if the interoperating programs are not associated with different addressing modes, i.e. they are operating in the same addressing mode, a global variable declared and defined by any of the programs can be used by another among the programs, because the programs share the same runtime environment which can get knowledge of the allocated address for the global variable and the allocated address is also under the same addressing mode, thus accessible to all the interoperating programs. However, if the interoperating programs are associated with different addressing modes, the different memory addressability capabilities as mentioned above make it possible that an allocated address to a global variable by a first program is not accessible to a second program with a more restricted memory addressability. Moreover, the different linkage conventions and runtime environments of the interoperating programs associated with different addressing modes hinders a program from getting knowledge of whether a global variable it wants to use has already been declared or defined by another of the interoperating programs or the address allocated to the global variable by the other program so that it can use the global variable directly.

In this regard of sharing global variables, existing approaches for supporting 32-bit and 64-bit interactions either fail to solve this particular task of sharing global variables, or come with a lot of limitations as to the application scenario or the O/S platform. For example, some approaches are limited to Windows platforms and some do not support nested calls, e.g. a 32-bit program calling a 64-bit program which then calls a 32-bit program. Further, some approaches are not transparent because users may need to change a lot of the original application which changes the routine way of declaration, definition and use of global variables.

Example embodiments of the disclosure provide a methodology for sharing global variables between programs associated with different addressing modes that is based on using a share area to pass address allocated to a global variable by a first program to a second program having a different addressing mode from the first program so that the second program is able to directly use/access the global variable without declaring or defining the global variable in advance, just in a way as if the first and second programs were associated with the same addressing mode.

Any of these techniques in accordance with example embodiments of the disclosure represents a technical solution that addresses the aforementioned technical problems associated with existing approaches for enabling global variables to be shared by any of the interoperating programs associated with different addressing modes. In particular, any of these techniques in accordance with example embodiments of the disclosure make the global variables widely reused in an application including multiple various large-scale programs. In addition, any of these techniques in accordance with example embodiments of the disclosure make an application architect able to do effortlessly fit-for-purpose placement of the application without having to re-architect the application code. Still further, any of these techniques in accordance with example embodiments significantly reduce the effort for design, development and maintaining of applications.

Each of the technical improvements, in accordance with example embodiments as described herein, constitute technical effects of the disclosure that together represent an improvement in computer technology and the functioning of a computer. In particular, these technical improvements enhance the function of a computer by allowing for flexible use of global variables by programs associated with different addressing modes, saving memory locations that would have been to a same global variable individually by the programs associated with different addressing modes.

Figure 4:
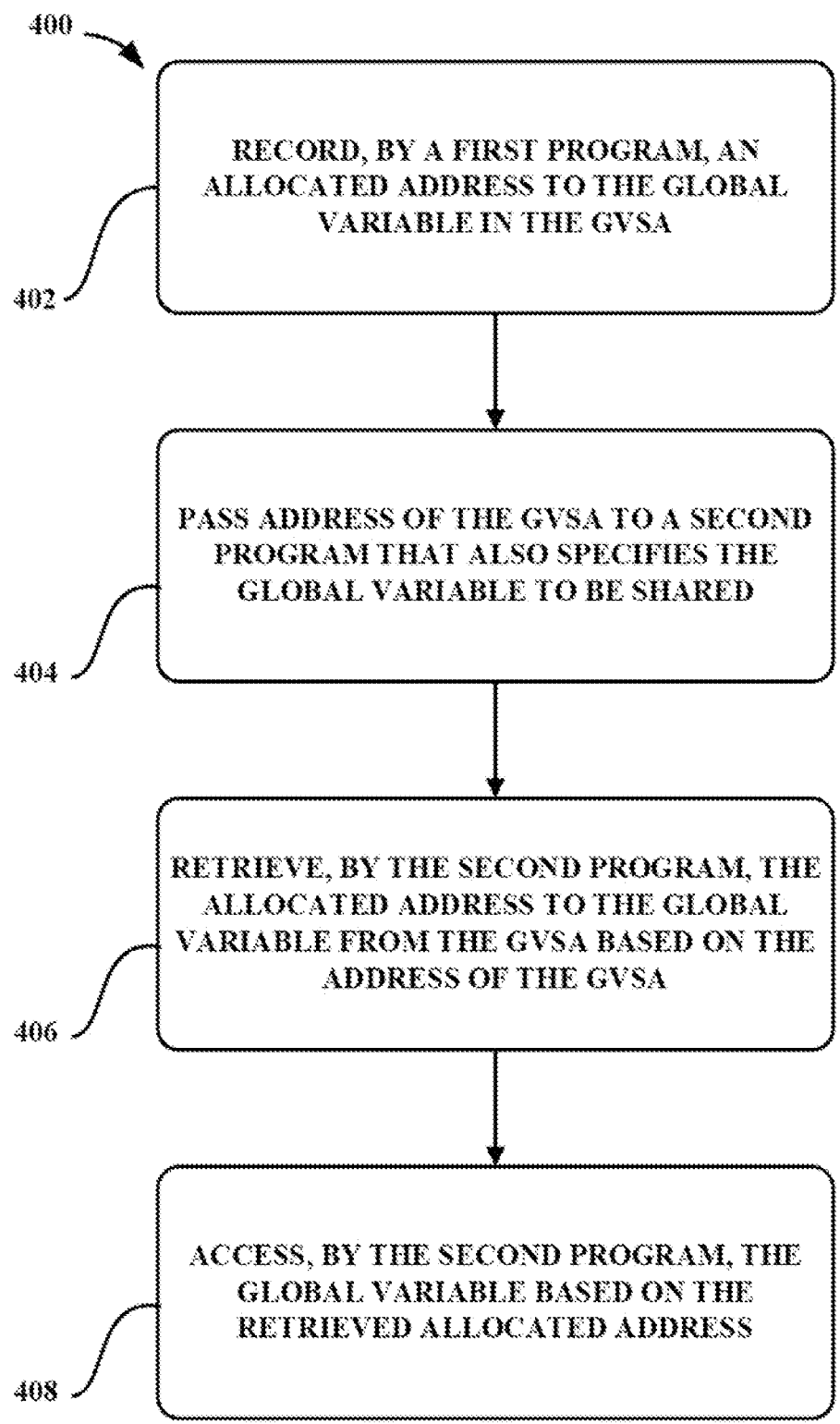
FIG. 4 is a process flow diagram of an illustrative method for sharing global variables between programs associated with different addressing modes according to an embodiment of the present disclosure.

FIG. 4 is a process flow diagram of an illustrative method 400 for sharing global variables between programs associated with different addressing modes according to an embodiment of the present disclosure.

Generally, an effective scope of a global variable is within an individual application and the global variable is "alive" during a process of the individual application (i.e. an execution of the application). Therefore, in the context of sharing global variables between programs associated with different addressing mode, it generally implies that the programs are included in the same application and that the programs associated with different addressing modes have direct or indirect interoperability therebetween. The term "application" as used herein refers to a collection of interoperating programs. For either two programs of the application, there may be direct or indirect interoperability between the two programs. For example, one program may directly call/reference another program, or indirectly interact with another program by both call/reference a third program or being connected via one or more intermediate programs. As a more specific example of the latter case, a first program may call/reference a third program which furthers call/reference a second program, which exhibits an indirect interaction between the first and the second programs.

At block 402, a first program of an application records an allocated address to a global variable in a global variable share area (GVSA). The application may include at least two programs associated with different addressing modes and the first program is one of them. The first program is associated with a first addressing mode and is configured to specify the global variable in the first program to be shared across different addressing modes.

In some embodiments, a program (e.g. the first program, or a second program as will be discussed below) of the application is configured to specify one or more of its global variables to be shared across different addressing modes. The program may declare and define a number of global variables, but not all of the global variables are to be shared across different addressing modes. Some of the global variables may only be used in the own addressing mode of the program. Therefore, the program may be configured to specify some or all of the global variables to be shared across different addressing modes.

To realize the specifying of sharing global variables, some steps may be taken in the compiling and linking process of the program before the program is generated so that the program is eventually generated with an information indicating that it wants to share some or all of its global variables to a different addressing mode and what the global variables to be shared are. In some embodiments, the program may be generated containing a shared variable accessing list (SVAL) to indicate at least names of the global variables to be shared across different addressing modes. The SVAL of a program is a collection of information about the global variables to be shared by the program to other programs associated with a different addressing mode. There may be one SVAL for each program. SVALs for different programs may indicate different global variables in the respective programs to be shared across different addressing modes.

In addition to a name of a global variable to be shared, in some embodiments, the SVAL may further include an offset address of an accessing pointer for the global variable to be shared with respect to a start address of a static data area (SDA). Generally, the storage allocation for global variables of a program may be as follows: during the compiling and linking process of the program, the compiler/linker determines offset addresses of accessing pointers for the global variables with respect to a start address of the SDA. But the SDA is not allocated yet at this time and the start address is not determined. Later, upon loading of the program, the runtime of the program allocates the SDA for the program and stores accessing pointers for the global variables according to the offset addresses determined in advance in the compiling and linking process. The runtime further allocates real storage to the global variables and assigns address of the allocated real storage as values of the accessing pointers so that a value of each accessing pointer points to the real storage address of the respective global variable. The real storage may be locations in physical memory/storage or may be in a virtual storage space. Then during the execution of the program, if a particular global variable is initialized or accessed or used, the runtime may locate the real storage address of the particular global variable via the corresponding accessing pointer for the particular global variable. Therefore, by including the offset address of the accessing pointer for the global variable in the SVAL, the runtime of the program is able to get the accessing pointer from the SDA and update the value of the accessing pointer to make it point to other storage addresses, even if the pointed storage addresses are in a storage program of another program. This would be beneficial in a case where the runtime of the program does not allocate a real storage to the global variable by itself but directly uses an address allocated to the global variable by other programs.

Figure 5:
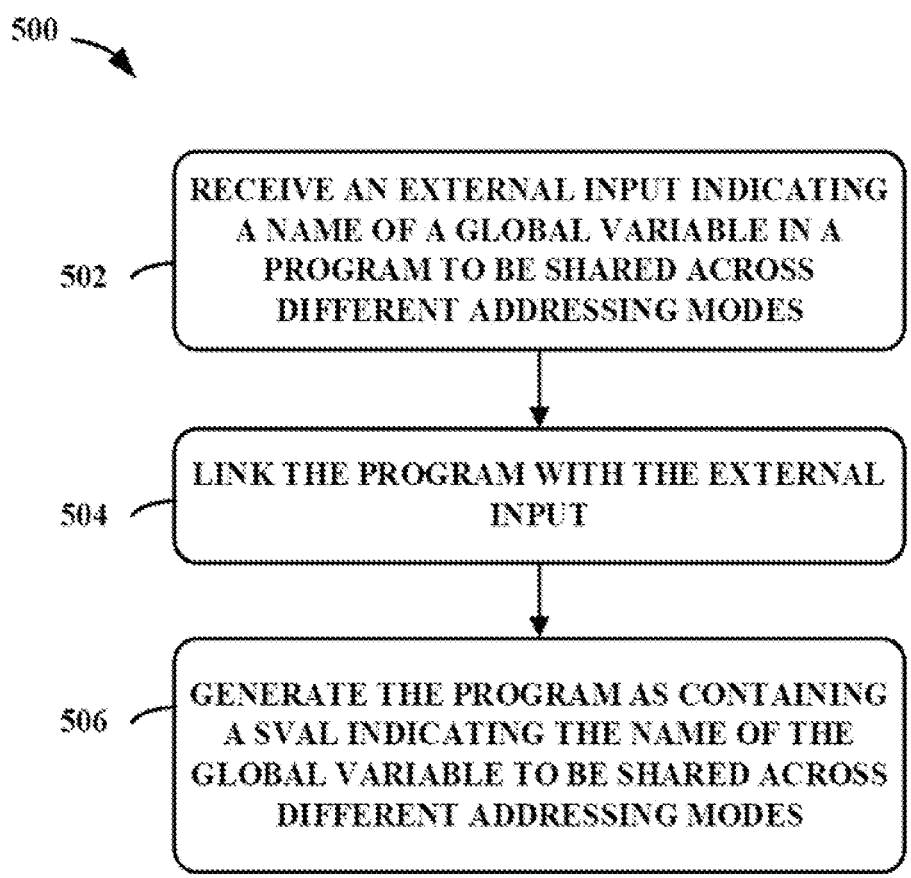
FIG. 5 is a process flow diagram of an illustrative method for generating a program specifying a global variable to be shared across different addressing modes according to an embodiment of the present disclosure.

The program containing the SVAL to indicate at least names of the global variables to be shared across different addressing modes may be generated using an illustrative method 500 as shown in FIG. 5. The method 500 describes the main steps taken in the compiling and linking process of the program. The method 500 may be carried out prior the method 400. An application may have some of all of its programs generated using the method of 500. For example, both the first program as mentioned at block 402 of FIG. 4 and a second program as will be discussed below at block 404 of FIG. 4 may be generated using the method of 500.

At block 502, during the compiling and linking process of a program, the compiler/linker may receive an external input indicating names of global variables to be shared across different addressing modes. The names of the global variables to be shared across different addressing modes may be provided by a programmer or a user of the program. Then at block 504, the compiler/linker may link the external input with the program. The external input may be implemented in a form of a file and there may be one such file for each program. Next, at block 506, the compiler/linker may generate the program with the external input contained. For example, the external input may exist as a segment of code at the beginning of the generated program. Thereby, when the program is loaded, the runtime of the program, upon analyzing the segment of code, may identify whether there are any global variables to be shared across different addressing modes and what they are.

Returning to FIG. 4, at block 402, in some embodiments, the allocated address to the global variable that is to be recorded into the GVSA is allocated by the first program itself. Specifically, the first program may search in the GVSA for any allocated address to the global variable, and if the GVSA is empty (which means that the GVSA is not established yet) or if the GVSA is not empty but does not have any allocated address to the global variable (which means that no address has been previously allocated to the global variable by any program of the application), the first program will not find the allocated address to the global variable in the GVSA. In response to this, the first program may allocate a first address to the global variable and record the first address in the GVSA as the allocated address to the global variable.

In some other embodiments, the allocated address to the global variable that is to be recorded into the GVSA by the first program is allocated by another program of the same application in advance. The other program may have the same addressing mode with the first program, but it may not specify that the global variable is to be shared across different addressing modes. Therefore, the other program may simply allocate an address to the global variable without recording the address to the GVSA. In this sense, the other program may be an ordinary/routine program which has not been generated containing the SVAL to indicate the global variables to be shared across different addressing modes according to the techniques discussed above. That is, the method 400 of the present disclosure would still work in a case that the application may contain any program that is not extended to support sharing global variables across different addressing modes, which shows a good compatibility of the method 400.

In some embodiments, to ensure that the global variable is accessible to another program associated with an addressing mode different from that of the program which allocates an address to the global variable, the address allocated to the global variable is addressable by the other program. Considering compatibility for more than two addressing modes, the allocated address to the global variable is addressable to any of the addressing modes, which means that the global variable would be stored at a storage space of a program of the application that has the most restrictive or smallest addressing space among all the programs of the application that are associated with more than two addressing modes.

In some embodiments, the first program may record a name of the global variable and the allocated address to the global variable in pair to the GVSA so that when the GVSA contains more than one global variable, an allocated address of any global variable may be retrieved by the name.

In some embodiments, the GVSA may be generated upon the first time any program of the application records a global variable into it. For example, as mentioned above, if the first program finds that the GVSA is empty and it is the first one to record a global variable into it, then it generates the GVSA by allocating a storage to the GVSA. As the GVSA is designed for passing information of allocated global variable to programs associated with different addressing modes, the GVSA may be placed at a storage that is accessible to all the programs associated with different addressing modes with which the first program desires to share a global variable. Like the global variable to be shared, the GVSA may also be placed at a storage space of a program of the application that has the most restrictive addressing space. If the GVSA has been generated prior to the loading of the first program, it means that another program has recorded some global variables into the GVSA and the address of the GVSA may be passed to the first program upon loading of the first program. In some embodiments, of all the programs in an application that specify a particular global variable to be shared across different addressing modes, the first program is the first one to be loaded. That is, the first program may refer to a program that finds the GVSA to be empty or the particular global variable is not included in the GVSA and thus the first program would record an allocated address (either by itself or by other programs in advance) to the particular global variable into the GVSA. In some embodiments, prior to the first program is able to record any allocated address to a global variable in the GVSA, the address of the GVSA has been passed from a fourth program to the first program, so that the fourth program is allowed to perform the recording based on the address of the GVSA. The fourth program may be a program loaded earlier than the first program in the application. The fourth program may generate the GVSA itself or obtain the address of the GVSA from any other program in the application. The fourth program may make a call to an external interface to execute the first program and pass the address of the GVSA to the first program.

Next, at block 404, an address of the GVSA is passed to a second program of the application. The second program is loaded after the first program has been loaded. In other words, during the loading of the application, the first program is loaded prior to the second program. The second program is associated with a second addressing mode and also specifies the global variable in the second program to be shared across different addressing modes. The second addressing mode is different from the first addressing mode. Recalling block 402, it can be seen that both the first program and the second program have the same global variable and both of them specify that the same global variable is to be shared across different addressing modes. In some embodiments, the first and second programs may share more than one such global variables. The second program may specify any global variable to be shared across different addressing modes in the same way as the first program as have been described above, including using the method 500 of FIG. 5.

In some embodiments, the first program calls the second program directly, and thus the address of the GVSA is passed directly by the first program to the second program. Specifically, a call to an external interface to execute the second program may be received from the first program. For example, the first program may be associated with AMODE M and the second program may be associated with AMODE N. The first program may make a call to an external interface, RunOnN( ), to execute the second program. Here an external interface, RunOnX( ), may be used to execute programs associated with AMODE X, where X may be M, N or P and the like which are different values to identify different addressing modes. For example, an external interface RunOnM( ) ay be used to execute programs associated with AMODE M, and an external interface RunOnP( ) may be used to execute programs associated with AMODE P. Such external interfaces, when called by a current primary runtime environment of a caller program (e.g. the first program), may store context of the current primary runtime environment, establish a secondary runtime environment for executing the target callee program (e.g. the second program) and make a transition to the second runtime environment to execute the target callee program. In addition, the external interfaces may further pass the address of the GVSA from the first program to the second program, no matter the address of the GVSA is allocated by the first program or is received by the first program from another program.

In some embodiments, the first program does not call the second program directly, but is rather connected with the second program via a third program of the application, and thus the address of the GVSA is passed by the third program to the second program. Just like the case where the first program calls the second program directly, the third program may make a call to the external interface to execute the second program and also the external interface passes the address of the GVSA from the third program to the second program. It should be recognized that the third program may be a single program or a set of programs that are intermediately situated between the first program and the second program and can be regarded as one virtual program. In some embodiments, the third program may be called by the first program. Accordingly, the address of the GVSA may be passed from the first program to the third program. In some other embodiments, the third program may make a call to the first program. Accordingly, the address of the GVSA may be passed from the third program to the first program. For example, the third program may be the fourth program that passes the address of the GVSA to the first program, except that as the third program, the fourth program is further required to pass the address of the GVSA to the second program. The third program may be or may be not generated with the SVAL like the first and second program, but it is able to receive the address of the GVSA when it is called or pass the address of the GVSA when it makes a call to another program.

Next, at block 406, the second program retrieves the allocated address to the global variable from the GVSA based on the address of the GVSA passed to the second program at block 404. If there is only one global variable recorded in the GVSA, the second program can directly retrieve the address for the global variable from the GVSA. However, if there are more than one global variable, to differentiate the different global variables, names of the global variables along with the allocated addresses to the global variables (name-allocated address pair) may be recorded into the GVSA. As such, the second program may retrieve the allocated address to a particular global variable from the GVSA by the name of the particular global variable.

Next, at block 408, the second program may access the global variable based on the retrieved allocated address to the global variable. In some embodiments, if an indirect accessing approach is adopted for the global variable in the second program, which means that the second program utilizes an accessing pointer for the global variable, the SVAL for the second program may further include, in addition to the name of the global variable to be shared across different addressing modes, an offset address of an accessing pointer for the global variable with respect to a start address of the SDA for the second program. When accessing the global variable based on the retrieved allocated address to the global variable, the second program obtains the offset address of the accessing pointer for the global variable from the SVAL for the second program, uses the offset address to locate the accessing pointer for the global variable in the SDA, and updates a value of the accessing pointer with the retrieved allocated address. As such, the updated value of the accessing pointer would point to the allocated address to the global variable. Then the second program may access the global variable based on the updated value of the accessing pointer.

In this way, with the method 400, the first and the second programs, although they are associated with different addressing modes, are able to get access to the same global variable, rather than independently use their own global variables. The global variables can be used across different addressing modes, which widens the scope of using the global variables and saves storage that would have been allocated to the same global variables by the programs associated with different addressing modes. The capability of sharing global variables across different addressing modes is provided by method 400 without having to re-architect any of the application code or re-design or maintaining of the application.

Figure 6:
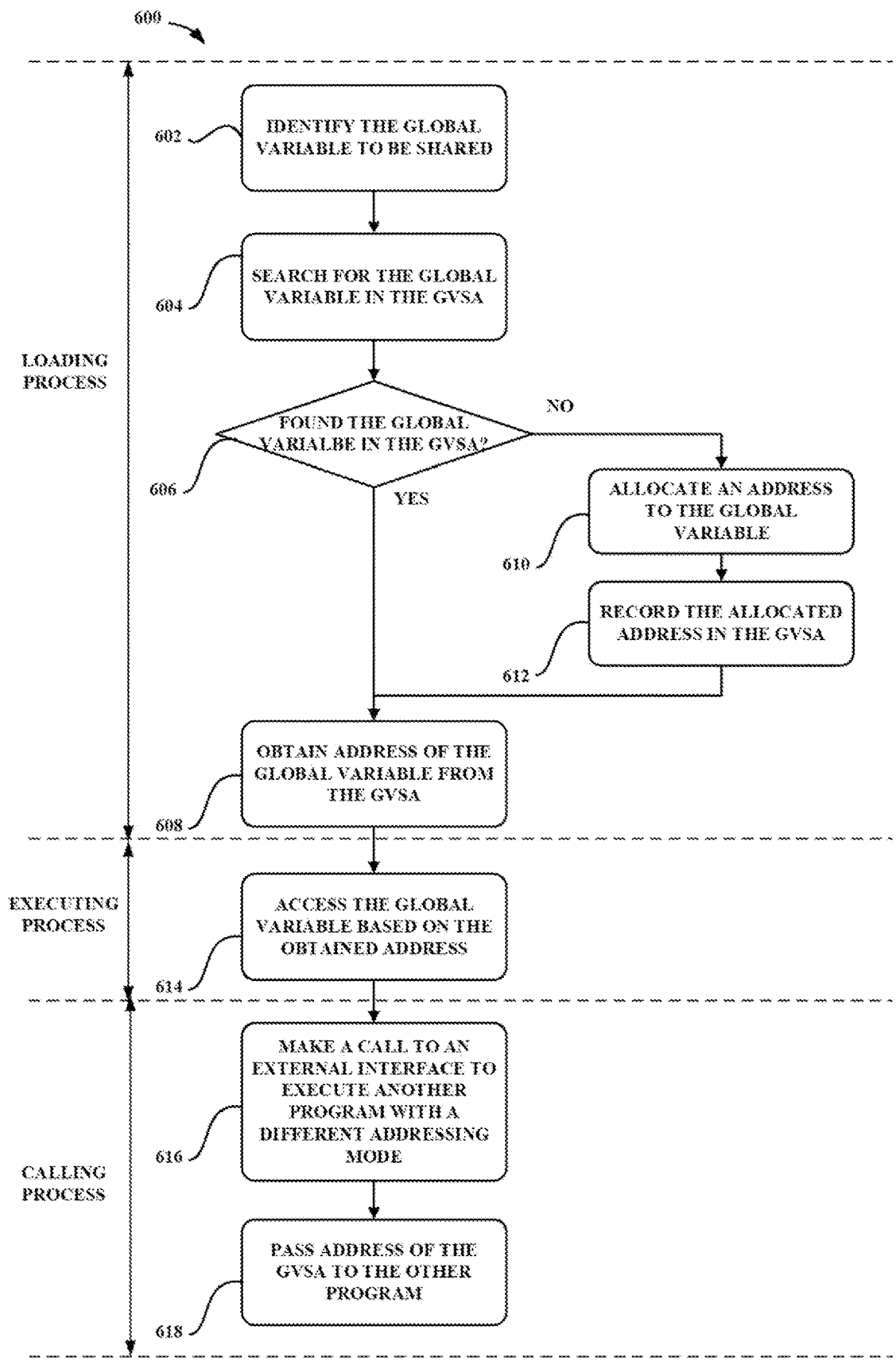
FIG. 6 is a process flow diagram of an illustrative method performed at a program including a loading process, an executing process and a calling process according to an embodiment of the present disclosure.

FIG. 6 is a process flow diagram of an illustrative method 600 performed at a program including a loading process, an executing process and a calling process according to an embodiment of the present disclosure. The program may be any program of an application that specifies a global variable in the program to be shared across different addressing modes. The program may be the first program discussed in the method 400 as being associated with the first addressing mode, or may be the second program discussed as being associated with the second addressing mode, or can be any other program in the application that is associated with a third different addressing mode.

Blocks 602-608 are operations that may be performed in a loading process of the program. First, at block 602, the runtime of the program may identify the global variable that the program has specified to be shared. For example, the program may include the SVAL that indicates the global variable to be shared across different addressing modes, and the runtime may analyze the SVAL and thus identifies the global variable to be shared. Then, at block 604, the runtime searches for the identified global variable in the GVSA. At block 606, the runtime determines if the global variable has been found in the GVSA. In response to a negative result at block 606, which indicates that the GVSA is empty or the global variable is not recorded in the GVSA, the runtime may allocate, at block 610, an address to the global variable and record, at block 612, the allocated address in the GVSA. In some cases, the address may have been allocated to the global variable by other programs in advance, and thus operation at block 610 may be skipped. Then, the runtime may obtain the address of the global variable from the GVSA at block 608. In response to a positive result at block 606, which indicates that an address has been allocated to the global variable and is ready to be used by another program since it has been recorded to the GVSA, the runtime also performs operation at block 608. If an indirect accessing approach is adopted for the global variable in the program, the runtime may update the value of the accessing pointer in the SDA for the program with the allocated address obtained from the GVSA at block 608, which means that the accessing pointer is now pointed to the allocated address of the global variable.

Block 614 is an operation that may be performed in an executing process of the program. With the address of the global variable obtained at block 608, at block 614, the runtime may access the global variable in response to any initializing or accessing or using instruction of the global variable in the program during the execution.

Blocks 616-618 are operations directed to a calling process of the program. At block 616, the runtime may make a call to an external interface to execute another program with an addressing mode different from the program. At block 618, the external interface passes the address of the GVSA to the other program.

The executing process or the calling process are not necessary for each program. In some embodiments, a program may not go through the operations of blocks 614-618 because it may not use/access/initialize the global variable or makes a call to other programs.

It can be understood that the operations of blocks 602-618 of the method 600 have been substantively described in the description of the method 400 with reference to FIG. 4, and for conciseness, more details for blocks 602-618 omitted here can be referred to in the description of the method 400. The description of method 600 serves to provide a particular angle from one of the programs in the application (e.g. the first program, or the second program) to help thoroughly understand the spirit and merits of the method 400.

FIG. 7A-7E together illustrate a whole exemplary process of using the GVSA to pass allocated address for a global variable in a case where a first program (PGM1) directly calls a second program (PGM2), according to an embodiment of the present disclosure.

Figure 7A:
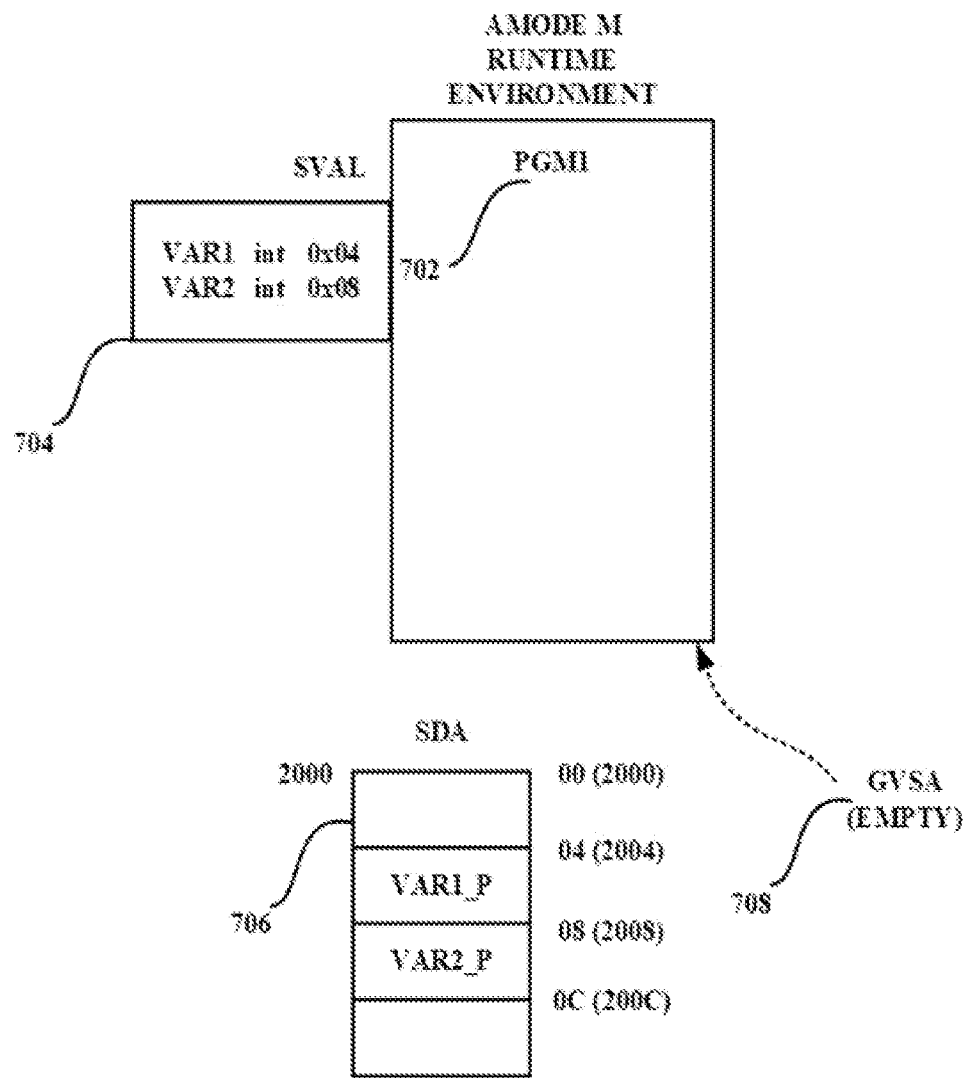
FIG. 7A is a schematic diagram illustrating loading a first program when the global variable sharing area (GVSA) is empty according to an embodiment of the present disclosure.

FIG. 7A illustratively shows a situation when the PGM1 702 is initially loaded. The PGM1 is associated with an AMODE M runtime environment. The PGM1 is generated including a SVAL 704 which includes two global variables VAR1 and VAR2 to be shared across different addressing modes. The SVAL also include the types of the two global variables (which are optional) and the offset addresses ('0x04' and '0x08') with respect to a start address of the SDA 706 for PGM1 702. The AMODE M runtime environment establishes the SDA at the start address ('2000') for storing parameters for PGM1 702, including accessing pointers VAR1_P and VAR2_P respectively for VAR1 and VAR2 arranged based on their respective offset addresses. At this time, the GVSA 708 is empty.

Figure 7B:
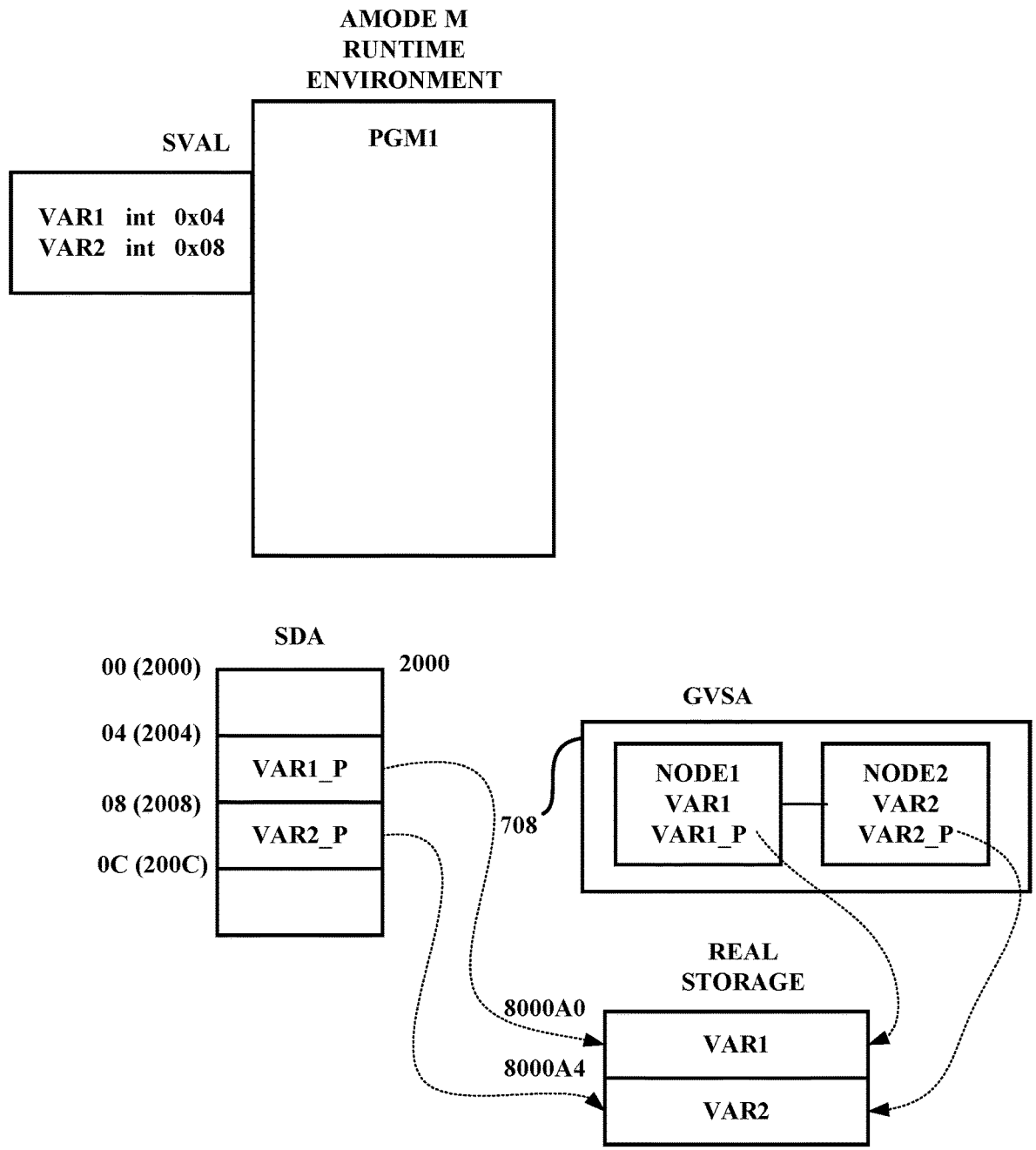
FIG. 7B is a schematic diagram illustrating allocating an address to a global variable by the first program and recording the allocated address to the GVSA according to an embodiment of the present disclosure.

Next, FIG. 7B illustratively shows the allocating of addresses to global variables and the recording into the GVSA by the first program PGM1. The AMODE M runtime environment searches in the GVSA for VAR1 and VAR2 and finds out that the GVSA is empty, and it also finds that the accessing pointers are not pointed to any real storage yet, then it allocates two addresses (8000A0 and 8000A4) in a real storage to store VAR1 and VAR2 respectively and makes the accessing pointers VAR1_P and VAR2_P to respectively point to the two real storage addresses. The AMODE M runtime environment further establishes two nodes in the GVSA respectively for VAR1 and VAR2, each including a name (VAR1 or VAR2) and a corresponding allocated address (value of VAR1_P or VAR2_P). That is, the names of the global variables to be shared and the corresponding allocated addresses are recorded to the GVSA. The loading of the PGM1 is completed.

Figure 7C:
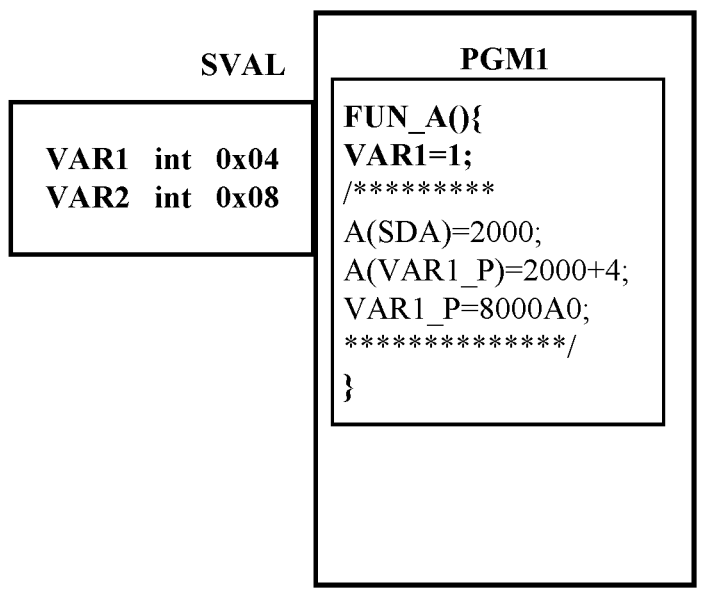
FIG. 7C is a schematic diagram illustrating accessing the global variable by the first program according to an embodiment of the present disclosure.
Figure 7C:
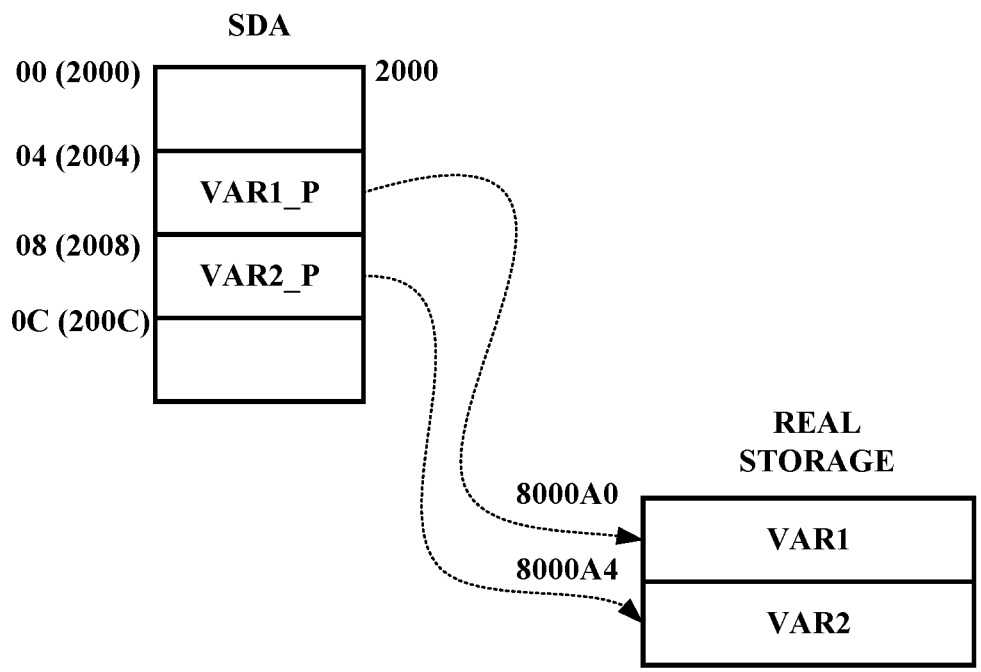

Next, FIG. 7C illustratively shows the underlying mechanism of accessing a global variable in PGM1 during the execution of PGM1. For example, PGM1 accesses VAR1 using an instruction of "VAR1=1" in a function (FUN_A( )). The AMOME M runtime environment will first identify the start address of the SDA, which is '2000' and then the address of the accessing pointer VAR1_P, '2004', which is the start address of the SDA ('2000') plus the respective offset address ('04'), and eventually get the value of the accessing pointer VAR1_P, '8000A0', which is the real storage address for VAR1. The accessing process in PGM1 is regardless of the addressing mode of PGM1, and is generally the same as the routine when PGM1 is not extended to support cross AMODE sharing of the global variable. That is, the accessing process is transparent to a user because the extension to support cross AMODE sharing of the global variable is unperceived by the user.

Figure 7D:
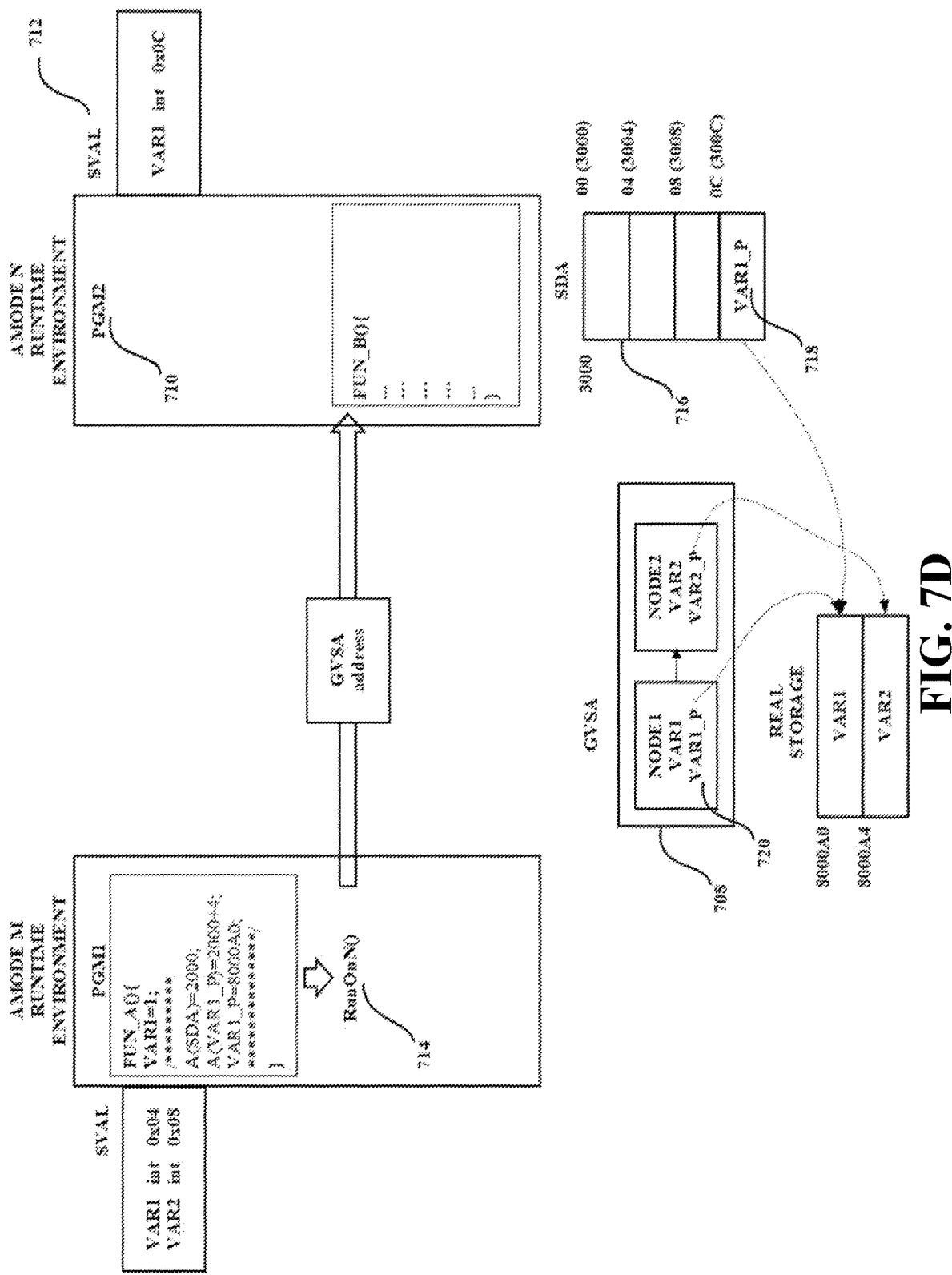
FIG. 7D is a schematic diagram illustrating calling to execute a second program by the first program and loading the second program according to an embodiment of the present disclosure.

Next, FIG. 7D illustratively shows a process of PGM1 makes a call to a second program (PGM2 710) and the loading of PGM2. PGM1 makes a call to a function (FUN_B( )) of PGM2. PGM2 is associated with an AMODE N runtime environment. Like PGM1, PGM2 is also generated including a SVAL (SVAL 712), which specifies that the first global variable VAR1 is to be shared across different addressing modes. The AMODE M runtime environment may make a call to an external interface (RunOnN( ) 714) to execute a program associated with AMODE N, which in this case is PGM2 710. The external interface establishes the AMODE N runtime environment for execution of PGM2. The external interface RunOnN ( ) 714 further passes, to the AMODE N runtime environment, an address of the GVSA, which has been obtained by the AMODE M runtime environment when the AMODE M runtime environment records VAR1 and VAR2 into the GVSA as shown in FIG. 7B. Then during the loading of PGM2 710, the AMODE N runtime environment establishes an SDA 716 at a start address '3000' and place an accessing pointer (VAR1_P 718) for VAR1 at an offset address of '0C' with respect to the start address of the SDA. But unlike what would be normally done for a global variable, the AMODE N runtime environment does not directly allocate a real storage address for the global variable VAR1. Instead, the AMODE N runtime environment reads from the SVAL 712 to obtain the offset address of the accessing pointer VAR1_P 718, checks if the GVSA 708 has already had an allocated address to VAR1 and obtains, in this example, the allocated address of VAR1_P 720 (which was allocated by PGM1 as in FIG. 7B) from the GVSA, and then updates the value of the accessing pointer VAR1_P 718 with the obtained allocated address VAR1_P 720. As such the accessing pointer 718 is pointed to an address previously allocated by PGM1 to the same global variable VAR1 and thus PGM2 710 or the AMODE N runtime environment does not need to allocate separately a real storage address to VAR1.

Figure 7E:
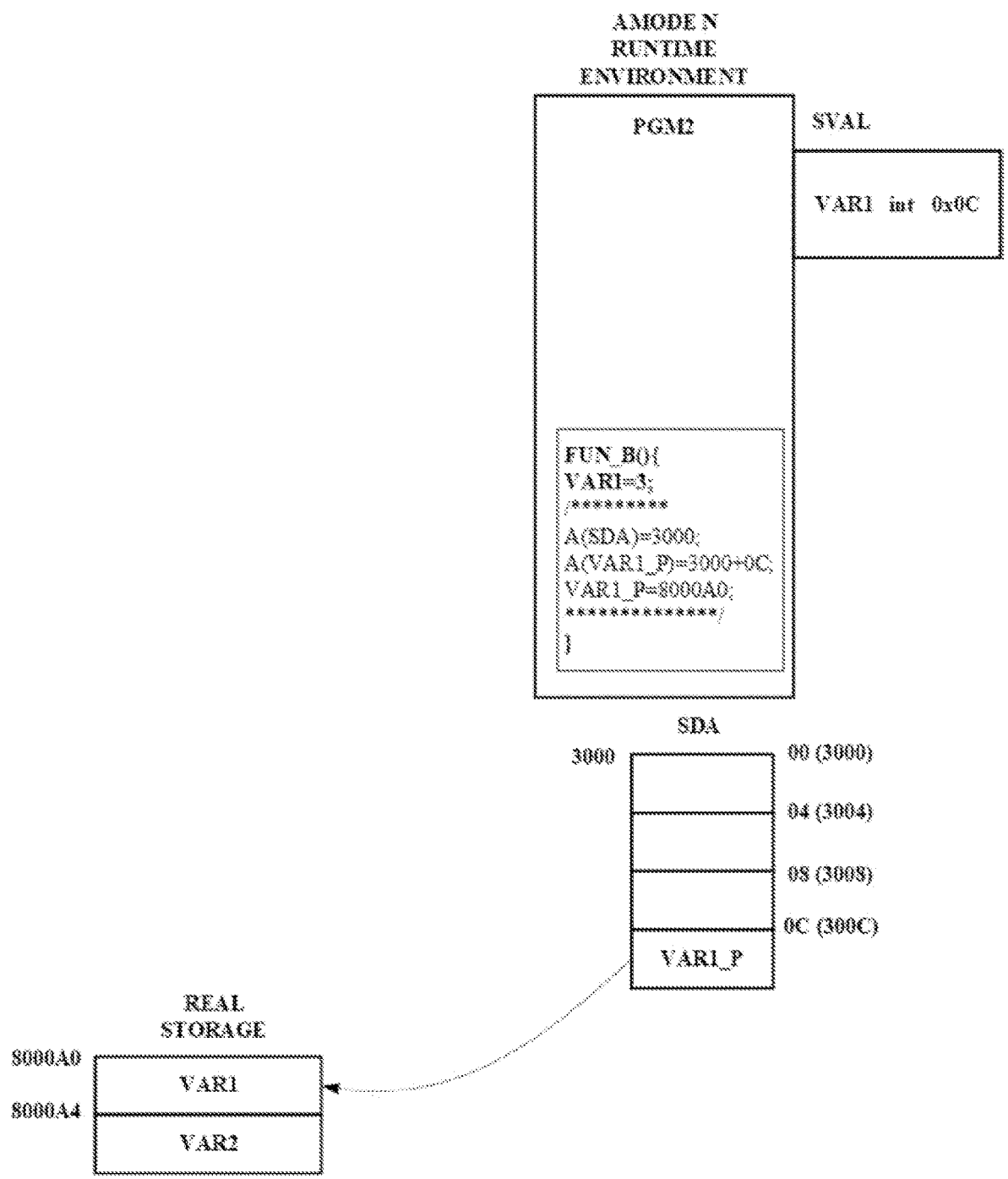
FIG. 7E is a schematic diagram illustrating accessing the global variable by the first program according to an embodiment of the present disclosure.

Next, FIG. 7E illustratively shows the underlying mechanism of accessing a global variable in PGM2 during the execution of PGM2. For example, PGM2 accesses VAR1 using an instruction of "VAR1=3" in a function (FUN_B( ). The AMOME N runtime environment will first identify the start address of the SDA, which is '3000' and then the address of the accessing pointer VAR1_P, which is the start address of the SDA ('3000') plus the respective offset address ('0° C.'), and eventually get the value of the accessing pointer VAR1_P, '8000A0', which is the real storage address for VAR1. The accessing process in PGM2 is regardless of the addressing mode of PGM2, and is generally the same as the routine when PGM2 is not extended to support cross AMODE sharing of the global variable. That is, the accessing process is transparent to a user because the extension to support cross AMODE sharing of the global variable is unperceived by the user.

It should be recognized that FIG. 7A-7E are provided merely to illustrate a specific example of applying the methods of the present application to sharing global variables across different addressing modes, and are not intended to limit the present disclosure in any specific number, parameter, configuration, step or sequence of steps. For example, the number of involved programs is not limited to two and the number of global variables that can be shared across different addressing modes can be one, two or any number more than two. The indirect accessing approach for global variables (i.e. the use of accessing pointers) may not be mandatory either.

It should also be recognized that, although the specific example of FIG. 7A-7E is related to a scenario of single threaded, direct call between two programs, the methods of the present disclosure can apply to multiple-thread calls or nested calls, because the single threaded, direct call where the methods of the present disclosure are applied constitutes a basis process for the multiple-thread calls or nested calls.

Figure 8:
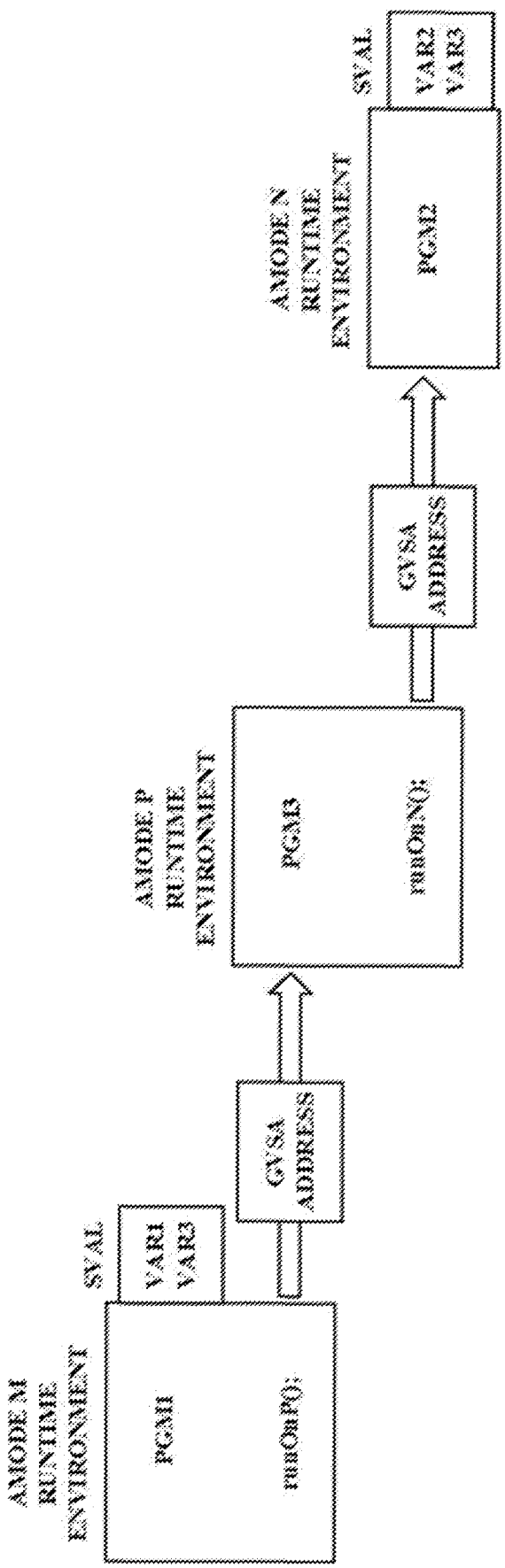
FIG. 8 is a schematic diagram showing an example of an indirect passing of the address of the GVSA from a first program to a second program according to an embodiment of the present disclosure.
Figure 9:
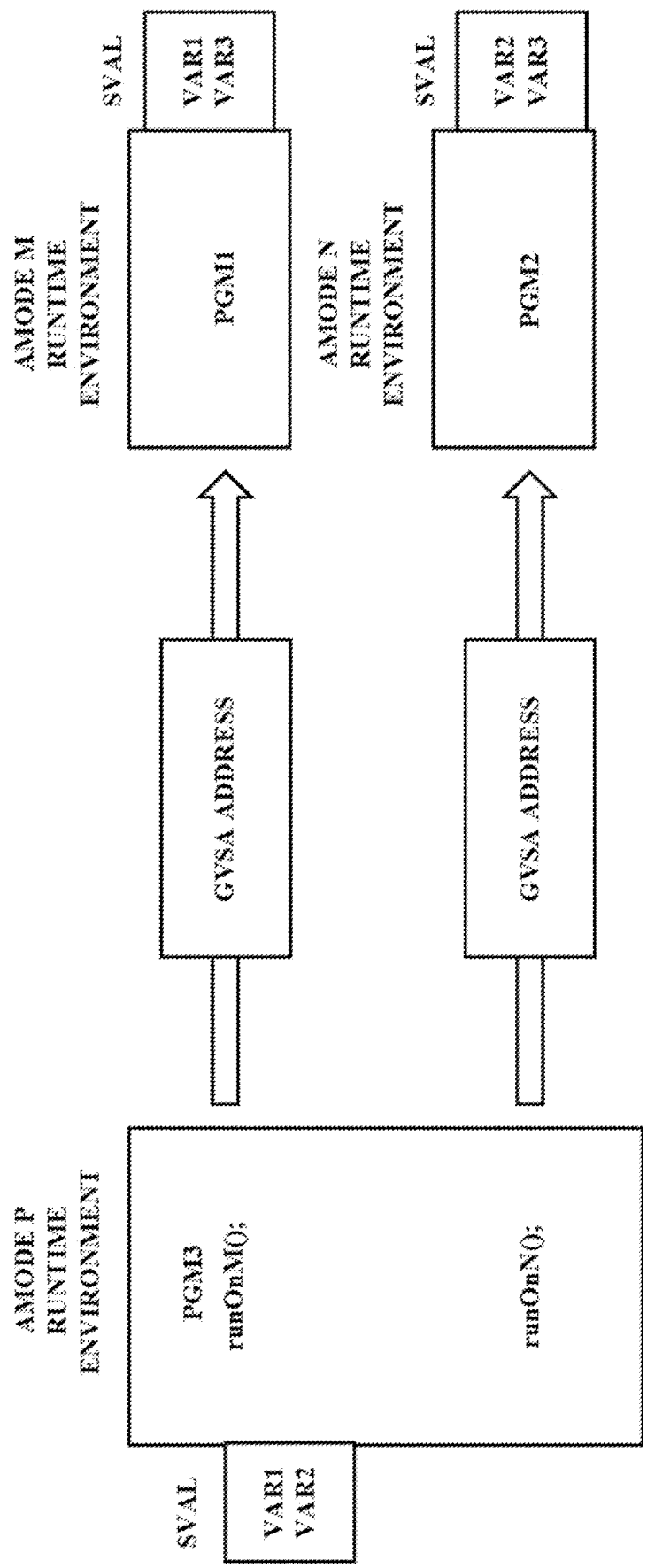
FIG. 9 is a schematic diagram showing an example of an indirect passing of the address of the GVSA from a first program to a second program according to an embodiment of the present disclosure.

The methods of the present disclosure can be further expanded to indirect calls between two programs. In the indirect calls, the address of the GVSA is not directly passed from the first program to the second program, but is relayed by one or more third programs. The third program(s) may make a call to an external interface to execute the second program and may pass the address of the GVSA from the third program(s) to the second program. Before the address of the GVSA is passed from the third program(s) to the second program, the address of the GVSA has been passed from the first program to the third program(s) or from the third program(s) to the first program. In either way, the GVSA can be shared between the first program and the second program. FIGS. 8-9 show two examples for the indirect calls.

In FIG. 8, both the first program (PGM1) associated with AMODE M and the second program (PGM2) associated with AMODE N specify a common global variable (VAR3) to be shared across different addressing modes. PGM1 running in the AMODE M runtime environment makes a call to an external interface (RunOnP( )) to execute a third program (PGM3) in the AMODE P runtime environment. PGM3 further makes a call to an external interface (RunOnN( )) to execute the second program PGM2. The AMODE M runtime environment of PGM1 may allocate an address to VAR3 and record the allocated address in the GVSA. The address of the GVSA is passed via RunOnP( ) from PGM1 to PGM3, and further via RunOnN( ) to PGM2. Then PGM2 may obtain the address allocated to VAR3 by PGM1 from the GVSA based on the received address of the GVSA, and use that address to access VAR3.

In FIG. 9, like in FIG. 8, both the first program (PGM1) associated with AMODE M and the second program (PGM2) associated with AMODE N also specify a common global variable (VAR3) to be shared across different addressing modes. Also, like in FIG. 8, in FIG. 9, the third program PGM3 makes a call to an external interface (RunOnN( )) to execute the second program PGM2. However, different from FIG. 8, FIG. 9 shows that the third program PGM3 makes a call to an external interface (RunOnM( )) to execute the first program PGM1 first and then PGM3 makes the call to the external interface (RunOnN( )) to execute PGM2. That is, both PGM1 and PGM2 are called by the same PGM3 sequentially. Accordingly, the address of the GVSA is passed via RunOnM( ) from PGM3 to PGM1 first. The AMODE M runtime environment of PGM1 may allocate an address to VAR3 and record the allocated address in the GVSA based on the received address of the GVSA. Then the address of the GVSA is passed via RunOnN( ) from PGM3 to PGM2. Then PGM2 may obtain the address allocated to VAR3 by PGM1 from the GVSA based on the received address of the GVSA, and use that address to access VAR3.

It should be recognized that for the examples of FIG. 8-9, the third program PGM3 does not have to be a single program, but can be one or more programs associated with one or more different addressing modes that are situated between PGM1 and PGM2 to help pass the address of the GVSA.

From the examples of FIG. 8-9, it can be understood that the methods of the present disclosure make it possible to share global variables between any two programs associated with different addressing modes of an application, even if the application is associated with more than two addressing modes. In this way, the global variables can be widely reused in an application including multiple various large-scale programs associated with different addressing modes.

It should be noted that the processing of method 400, 500 and 600 according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

According to an embodiment of the present disclosure, there is provided a computer system. The computer system comprises a processor and a computer-readable memory coupled to the processor. The memory comprises instructions that when executed by the processor perform recording, by a first program of an application, an allocated address to a global variable in a global variable share area (GVSA). The first program is associated with a first addressing mode and specifies the global variable in the first program to be shared across different addressing modes. The memory further comprises instructions that when executed by the processor further perform passing an address of the GVSA to a second program of the application that is loaded after the first program has been loaded. The second program is associated with a second addressing mode different from the first addressing mode and also specifies the global variable in the second program to be shared across different addressing modes. The memory further comprises instructions that when executed by the processor further perform retrieving, by the second program, the allocated address to the global variable from the GVSA based on the address of the GVSA. The memory further comprises instructions that when executed by the processor further perform recording, by the first program, the first address in the GVSA as the allocated address to the global variable.

According to an embodiment of the computer system, the first program specifies the global variable in the first program to be shared across different addressing modes via a first shared variable accessing list (SVAL) contained in the first program that indicate the name of the global variable in the first program to be shared across different addressing modes, and the second program specifies the global variable in the second program to be shared across different addressing modes via a second SVAL contained in the second program that indicates the name of the global variable in the second program to be shared across different addressing modes.

According to an embodiment of the computer system, the first program is generated containing the first SVAL in response to receiving an external input indicating the name of the global variable in the first program to be shared across different addressing modes during a compiling and linking process for the first program.

According to an embodiment of the computer system, in addition to the name of the global variable, the second SVAL further indicates an offset address of an accessing pointer for the global variable with respect to a start address of a static data area (SDA), and the accessing the global variable based on the retrieved allocated address further comprises obtaining, by the second program, the offset address of the accessing pointer for the global variable from the second SVAL, updating, by the second program, a value of the accessing pointer for the global variable in the SDA with the retrieved allocated address based on the offset address, and accessing, by the second program, the global variable based on the updated value of the accessing pointer for the global variable.

According to an embodiment of the computer system, the passing the address of the GVSA to the second program further comprises receiving, from the first program, a call to an external interface to execute the second program, and passing, by the external interface, the address of the GVSA from the first program to the second program.

According to an embodiment of the computer system, the passing the address of the GVSA to the second program further comprises receiving, from a third program, a call to an external interface to execute the second program, and passing, by the external interface, the address of the GVSA from the third program to the second program. The address of the GVSA has been passed from the first program to the third program before the address of the GVSA is passed from the third program to the second program.

According to an embodiment of the computer system, the recording the allocated address to the global variable in the GVSA further comprises: passing the address of the GVSA from a third program to the first program, and recording, by the first program, the allocated address to the global variable in the GVSA based on the address of the GVSA passed from the third program to the first program, and the passing the address of the GVSA to the second program further comprises receiving, from the third program, a call to an external interface to execute the second program, and passing, by the external interface, the address of the GVSA from the third program to the second program.

According to an embodiment of the present disclosure, there is provided a computer program product. The computer program product comprises a computer readable storage medium having program instructions embodied therewith. The program instructions are executable by a processor to cause the processor to record, by a first program of an application, an allocated address to a global variable in a global variable share area (GVSA). The first program is associated with a first addressing mode and specifies the global variable in the first program to be shared across different addressing modes. The program instructions are executable by a processor to further cause the processor to pass an address of the GVSA to a second program of the application that is loaded after the first program has been loaded. The second program is associated with a second addressing mode different from the first addressing mode and also specifies the global variable in the second program to be shared across different addressing modes. The program instructions are executable by a processor to further cause the processor to, retrieve, by the second program, the allocated address to the global variable from the GVSA based on the address of the GVSA. The program instructions are executable by a processor to further cause the processor to access, by the second program, the global variable based on the retrieved allocated address.

According to an embodiment of the computer program product, to record the allocated address to the global variable in the GVSA, the program instructions are executable by the processor to further causes the processor to search, by the first program, for the allocated address to the global variable in the GVSA, and in response to the allocated address to the global variable being not found in the GVSA (e.g., where the global variable being "not found" is an active result that comes from searching for the allocated address and returning some capacity of a "null" response), to allocate, by the first program, a first address to the global variable and to record, by the first program, the first address in the GVSA as the allocated address to the global variable.

According to an embodiment of the computer program product, the first program specifies the global variable in the first program to be shared across different addressing modes via a first shared variable accessing list (SVAL) contained in the first program that indicates a name of the global variable in the first program to be shared across different addressing modes, and the second program specifies the global variable in the second program to be shared across different addressing modes via a second SVAL contained in the second program that indicates a name of the global variable in the second program to be shared across different addressing modes.

According to an embodiment of the computer program product, the first program is generated containing the first SVAL in response to receiving an external input indicating the name of the global variable in the first program to be shared across different addressing modes during a compiling and linking process for the first program.

According to an embodiment of the computer program product, to pass the address of the GVSA to the second program, the program instructions are executable by the processor to further causes the processor to receive, from the first program, a call to an external interface to execute the second program, and to pass the address of the GVSA from the first program to the second program.

According to an embodiment of the computer program product, to pass the address of the GVSA to the second program, the program instructions are executable by the processor to further causes the processor to receive, from a third program, a call to an external interface to execute the second program, and to pass the address of the GVSA from the third program to the second program. The address of the GVSA has been passed from the first program to the third program before the address of the GVSA is passed from the third program to the second program.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    recording, by a first program of an application executing on one or more processing units, an allocated address to a global variable in a global variable share area (GVSA), wherein the first program is associated with a first addressing mode and the first program is configured to specify the global variable in the first program to be shared across different addressing modes;
    passing, by the one or more processing units, an address of the GVSA to a second program of the application that is loaded after the first program has been loaded, wherein the second program is associated with a second addressing mode different from the first addressing mode and the second program specifies the global variable in the second program to be shared across different addressing modes;
    retrieving, by the second program executing on the one or more processing units, the allocated address to the global variable from the GVSA based on the address of the GVSA;
    accessing, by the second program, the global variable based on the retrieved allocated address, and
    executing based on accessing the global variable, the second program, wherein the second program an addressing mode different from the first program.

2. The computer-implemented method of claim 1, wherein the recording the allocated address to the global variable in the GVSA further comprises:
    searching, by the first program, for the allocated address to the global variable in the GVSA; and
    in response to the allocated address to the global variable being not found in the GVSA:
    allocating, by the first program, a first address to the global variable; and
    recording, by the first program, the first address in the GVSA as the allocated address to the global variable.

3. The computer-implemented method of claim 1, wherein the first program specifies the global variable in the first program to be shared across different addressing modes via a first shared variable accessing list (SVAL) contained in the first program that indicates a name of the global variable in the first program to be shared across different addressing modes, and
    wherein the second program specifies the global variable in the second program to be shared across different addressing modes via a second SVAL contained in the second program that indicates the name of the global variable in the second program to be shared across different addressing modes.

4. The computer-implemented method of claim 3, wherein the first program is generated containing the first SVAL in response to receiving a first external
    input indicating the name of the global variable in the first program to be shared across different addressing modes during a compiling and linking process for the first program.

5. The computer-implemented method of claim 3, wherein in addition to the name of the global variable, the second SVAL further indicates an offset address of an accessing pointer for the global variable with respect to a start address of a static data area (SDA), and
    wherein the accessing the global variable based on the retrieved allocated address further comprises:
        obtaining, by the second program, the offset address of the accessing pointer for the global variable from the second SVAL;
        updating, by the second program, a value of the accessing pointer for the global variable in the SDA with the retrieved allocated address based on the offset address; and
        accessing, by the second program, the global variable based on the updated value of the accessing pointer for the global variable.

6. The computer-implemented method of claim 1, wherein the passing the address of the GVSA to the second program further comprises:
    receiving, by the one or more processing units from the first program, a call to an external interface to execute the second program; and
    passing, by the external interface, the address of the GVSA from the first program to the second program.

7. The computer-implemented method of claim 1, wherein the passing the address of the GVSA to the second program further comprises:
    receiving, by the one or more processing units from a third program, a call to an external interface to execute the second program; and
    passing, by the external interface, the address of the GVSA from the third program to the second program,
        wherein the address of the GVSA has been passed from the first program to the third program before the address of the GVSA is passed from the third program to the second program.

8. The computer-implemented method of claim 1,
    wherein recording, by the first program of the application executing on the one or more processing units, the allocated address to the global variable in the GVSA further comprises:
        passing, by the one or more processing units, the address of the GVSA from a third program to the first program; and
        recording, by the first program, the allocated address to the global variable in the GVSA based on the address of the GVSA passed from the third program to the first program, and
    wherein the passing the address of the GVSA to the second program further comprises:
        receiving, by the one or more processing units from the third program, a call to an external interface to execute the second program; and
        passing, by the external interface, the address of the GVSA from the third program to the second program.

9. A computer system comprising:
a processor; and
a computer-readable memory coupled to the processor, the memory comprising instructions that when executed by the processor perform:
recording, by a first program of an application, an allocated address to a global variable in a global variable share area (GVSA), wherein the first program is associated with a first addressing mode and the first program is configured to specify the global variable in the first program to be shared across different addressing modes;
passing an address of the GVSA to a second program of the application that is loaded after the first program has been loaded, wherein the second program is associated with a second addressing mode different from the first addressing mode and the second program specifies the global variable in the second program to be shared across different addressing modes;
retrieving, by the second program, the allocated address to the global variable from the GVSA based on the address of the GVSA;
accessing, by the second program, the global variable based on the retrieved allocated address, and
executing based on accessing the global variable, the second program, wherein the second program an addressing mode different from the first program.

10. The computer system of claim 9, wherein the recording the allocated address to the global variable in the GVSA further comprises:
searching, by the first program, for the allocated address to the global variable in the GVSA; and
in response to the allocated address to the global variable being not found in the GVSA:
allocating, by the first program, a first address to the global variable; and
recording, by the first program, the first address in the GVSA as the allocated address to the global variable.

11. The computer system of claim 9,
wherein the first program specifies the global variable in the first program to be shared across different addressing modes via a first shared variable accessing list (SVAL) contained in the first program that indicate a name of the global variable in the first program to be shared across different addressing modes, and
wherein the second program specifies the global variable in the second program to be shared across different addressing modes via a second SVAL contained in the second program that indicates the name of the global variable in the second program to be shared across different addressing modes.

12. The computer system of claim 11, wherein the first program is generated containing the first SVAL in response to receiving an external input indicating the name of the global variable in the first program to be shared across different addressing modes during a compiling and linking process for the first program.

13. The computer system of claim 11,
wherein in addition to the name of the global variable, the second SVAL further indicates an offset address of an accessing pointer for the global variable with respect to a start address of a static data area (SDA), and
wherein the accessing the global variable based on the retrieved allocated address further comprises:
obtaining, by the second program, the offset address of the accessing pointer for the global variable from the second SVAL;
updating, by the second program, a value of the accessing pointer for the global variable in the SDA with the retrieved allocated address based on the offset address; and
accessing, by the second program, the global variable based on the updated value of the accessing pointer for the global variable.

14. The computer system of claim 9, wherein the passing the address of the GVSA to the second program further comprises:
receiving, from the first program, a call to an external interface to execute the second program; and
passing, by the external interface, the address of the GVSA from the first program to the second program.

15. The computer system of claim 9,
wherein the passing the address of the GVSA to the second program further comprises:
receiving, from a third program, a call to an external interface to execute the second program; and
passing, by the external interface, the address of the GVSA from the third program to the second program,
wherein the address of the GVSA has been passed from the first program to the third program before the address of the GVSA is passed from the third program to the second program.

16. A computer program product, comprising a computer readable storage medium having program instructions embodied therewith, the program instructions executable by a processor to cause the processor to:
record, by a first program of an application, an allocated address to a global variable in a global variable share area (GVSA), wherein the first program is associated with a first addressing mode and the first program is configured to specify the global variable in the first program to be shared across different addressing modes;
pass an address of the GVSA to a second program of the application that is loaded after the first program has been loaded, wherein the second program is associated with a second addressing mode different from the first addressing mode and the second program specifies the global variable in the second program to be shared across different addressing modes;
retrieve, by the second program, the allocated address to the global variable from the GVSA based on the address of the GVSA;
access, by the second program, the global variable based on the retrieved allocated address; and
executing, based on accessing the global variable, the second program, wherein the second program an addressing mode different from the first program.

17. The computer program product of claim 16, to record the allocated address to the global variable in the GVSA, the program instructions are executable by the processor to further causes the processor to:
search, by the first program, for the allocated address to the global variable in the GVSA; and
in response to the allocated address to the global variable being not found in the GVSA:
allocate, by the first program, a first address to the global variable; and
record, by the first program, the first address in the GVSA as the allocated address to the global variable.

18. The computer program product of claim 16, wherein the first program specifies the global variable in the first program to be shared across different addressing modes via a first shared variable accessing list (SVAL) contained in the first program that indicates a name of the global variable in the first program to be shared across different addressing modes, and wherein the second program specifies the global variable in the second program to be shared across different addressing modes via a second SVAL contained in the second program that indicates a name of the global variable in the second program to be shared across different addressing modes.

19. The computer program product of claim 16, to pass the address of the GVSA to the second program, the program instructions are executable by the processor to further causes the processor to:

receive, from the first program, a call to an external interface to execute the second program; and pass the address of the GVSA from the first program to the second program.

20. The computer program product of claim 16, to pass the address of the GVSA to the second program, the program instructions are executable by the processor to further causes the processor to:

receive, from a third program, a call to an external interface to execute the second program; and pass the address of the GVSA from the third program to the second program, wherein the address of the GVSA has been passed from the first program to the third program before the address of the GVSA is passed from the third program to the second program.

* * * * *